(12) United States Patent
Akiho et al.

(10) Patent No.: US 7,833,422 B2
(45) Date of Patent: Nov. 16, 2010

(54) PROCESS OF TREATING SELENIUM-CONTAINING LIQUID

(75) Inventors: Hiroyuki Akiho, Yokosuka (JP); Shigeo Ito, Yokosuka (JP); Hiromitsu Matsuda, Yokosuka (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 12/193,183

(22) Filed: Aug. 18, 2008

(65) Prior Publication Data

US 2009/0065446 A1 Mar. 12, 2009

(30) Foreign Application Priority Data

| Sep. 11, 2007 | (JP) | ............................. 2007-235210 |
| Dec. 11, 2007 | (JP) | ............................. 2007-319732 |
| Jun. 6, 2008 | (JP) | ............................. 2008-149837 |

(51) Int. Cl.
*C02F 1/70* (2006.01)
*C01G 45/02* (2006.01)
*C01B 19/00* (2006.01)

(52) U.S. Cl. ....................... 210/757; 210/759; 210/912; 423/50; 423/508

(58) Field of Classification Search ................. 210/702, 210/668, 683, 684, 688, 717, 719, 721, 722, 210/749, 757, 758, 912; 423/50, 242.1, 243.01, 423/243.11; 95/235
See application file for complete search history.

(56) References Cited

U.S. PATENT DOCUMENTS

| 4,405,464 | A | | 9/1983 | Baldwin et al. |
| 5,264,133 | A | * | 11/1993 | Forschner et al. ........... 210/688 |
| 5,993,667 | A | * | 11/1999 | Overman .................... 210/709 |

OTHER PUBLICATIONS

"Inhibitor" definition. Merriam-Webster Online Dictionary. 2009.*
Kaplan et al. "Formation of a Barrier to Groundwater Contaminants by the Injection of Zero-Valent Iron Colloids: Suspension Properties," In-Situ Remediation: Scientific Basis for Current and Future Technologies., Thirty-Third Hanford Symposium on Health and the Environment. pp. 821-837 (1994).*
Yoshihiro Etoh et al.; Chemical Equipment of "Processing of New Effluent Standard Items, Selenium/Fluorine/Boron", No. 8, 42 (2003); 6pgs.
Andrew P. Murphy; Removal of Selenate from Water by Chemical Reduction, Ind. Eng. Chem. Res. 1988, 27, pp. 187-191.

* cited by examiner

*Primary Examiner*—Matthew O Savage
*Assistant Examiner*—Lucas Stelling
(74) *Attorney, Agent, or Firm*—Young & Thompson (57) ABSTRACT

It is to provide a process of treating a selenium-containing liquid which can inexpensively treat the selenium-containing liquid. The formation of selenate is inhibited by adding at least one selected from a group consisting of Ti and Mn into the selenium-containing liquid.

6 Claims, 11 Drawing Sheets

FIG. 6A sample(22)

FIG. 6B sample(23)

PROCESS OF TREATING SELENIUM-CONTAINING LIQUID

The entire disclosure of Japanese Patent Applications Nos. 2007-235210 filed on Sep. 11, 2007, 2007-319732 filed on Dec. 11, 2007 and 2008-149837 filed on Jun. 6, 2008 is expressly incorporated by reference herein.

BACKGROUND OF THE INVENTION

1. Field of the Invention

The present invention relates to a process of treating a selenium-containing liquid.

2. Background Art

In general, coals used in the coal fired power plants contain a very small amount of selenium. When the coals are burned in a coal fired power plant, the selenium in the coals is mixed into coal ashes captured by an electrostatic precipitator or into an absorbing solution (desulfurization slurry) from a wet flue gas desulfurization unit. Since the effluent standard value of selenium has been already set (0.1 mg/l) in Japan, the absorbing solution from the wet flue gas desulfurization unit may have to be treated to satisfy this standard even as desulphurization wastewater.

Selenium in the wastewater exists both as selenate (hexavalent selenic ion: $SeO_4^{2-}$) and as selenite (quadrivalent selenic ion: $SeO_3^{2-}$). In this case, the selenite can be treated by a general treatment process such as coagulation-sedimentation using iron or ion exchange method. On the other hand, the selenate cannot be treated by such a process. Therefore, there is known in the art a method of reducing the selenate into selenite or zero-valent metal selenium using granulating irons as a reducer, the selenite or zero-valent metal selenium being treated by the coagulation-sedimentation or other method (e.g., see a non-patent document, Yoshihiro Etoh and Others, Chemical Equipment of "Processing of New Effluent Standard Items, Selenium/Fluorine/Boron", No. 8, 42 (2003)).

SUMMARY OF THE INVENTION

This method of the prior art can retrieve the selenium since selenate which is difficult to treat is reduced into selenite or zero-valent selenium. However, the method of the prior art raises problems in that a large quantity of granulating irons are required to reduce the selenium and a large quantity of iron hydroxides (sludge) which are costly to treat are thus produced.

Therefore, an object of the present invention is to overcome the problems in the prior art by providing an inexpensive process of treating a selenium-containing liquid.

The present invention provides a process of treating a selenium-containing liquid, wherein the formation of selenate is inhibited by adding at least one selected from a group consisting of Ti and Mn to the selenium-containing liquid.

According to the present invention, the formation of selenate which is difficult to treat can be easily and simply inhibited by adding at least one selected from a group consisting Ti and Mn to the selenium-containing liquid to suppress the oxidation created from the selenite to the selenate, rather than by reducing the selenate into the selenite after the selenate has been produced. Here, it is conceivable that peroxodisulfuric acid is an oxidation agent for oxidizing the selenite to create the selenate. According to the present invention, the formation of selenate can be inhibited by adding Ti to decompose this peroxodisulfuric acid. In this case, the aftertreatment of Ti can be performed without addition of cost. If Mn is added, the peroxodisulfuric acid reacts with Mn preferentially before it reacts with the selenite to produce manganese dioxide. Thus, the oxidation of selenite can be inhibited. As a result, the formation of selenate can be inhibited. Since the selenite is absorbed and immobilized by the manganese dioxide, the selenite which can be oxidized to create the selenate is further decreased in quantity. Thus, the formation of selenate can be further inhibited. In this case, Mn can be aftertreated without addition of cost as in the case of Ti since Mn will be settled as manganese dioxide. In this regard, the selenium-containing liquid in the present invention includes liquid-like materials containing selenium such as aqueous solution, dispersion and suspension (slurry) which contain selenium, but not include solid-like or gaseous materials. In the present invention, the selenate designates hexavalent selenic ion ($SeO_4^{2-}$) while the selenite denotes quadrivalent selenic ion ($SeO_3^{2-}$).

It is preferred that Mn is added to the selenium-containing liquid so that the concentration of Mn becomes equal to or higher than 2 mg/l in the selenium-containing liquid. This is because if the concentration of Mn is equal to or higher than 2 mg/l in the selenium-containing liquid, the formation of selenate can be efficiently inhibited.

In this case, it is preferred that the formation of selenate is inhibited by adding Mn into the selenium-containing liquid so that the concentration of Mn is in the range of 2 mg/l to 12 mg/l. This is because if the concentration of Mn exceeds 12 mg/l, the selenate may be easily formed.

It is more preferred that the formation of selenate is inhibited by adding Mn into the selenium-containing liquid so that the concentration of Mn is in the range of 5 mg/l to 9 mg/l. If the concentration of Mn is in the range of 5 mg/l to 9 mg/l, the oxidation of selenite to create selenate can be performed more effectively with immobilization of the selenite to manganese dioxide.

It is preferred that Mn added to the selenium-containing liquid has its valence lower than quadrivalence, that is, zero-valence or bivalence so that the formation of selenate can be effectively inhibited by oxidizing Mn itself to create the manganese dioxide that is quadrivalent. The zero-valent Mn means a solid-like metal Mn. Further, the bivalent Mn means a solid-like bivalent Mn compound (e. g., MnO) or an aqueous Mn solution which is prepared to have bivalent ion ($Mn^{2+}$) by dissolving a bivalent Mn compound. Furthermore, it is preferred that Mn is added in the state of an aqueous Mn solution so that the handling and concentration control can be facilitated.

It is preferred that the selenium-containing liquid is an absorbing solution or desulfurization wastewater from the wet flue gas desulfurization unit. If the absorbing solution or desulfurization wastewater from the wet flue gas desulfurization unit is treated according to the process of the present invention, the formation of selenate which is difficult to treat can be inhibited. Here, the absorbing solution denotes a liquid which is within the desulfurization system (absorption tower or recirculation section) and which absorbs sulfur oxides under desulfurization reaction (gypsum slurry or the like). The desulfurization wastewater designates a liquid which flows out of the desulfurization system until it reaches the wastewater treatment equipment.

According to the process of treating selenium of the present invention, the formation of selenate can be inhibited so that most of the selenium in the selenium-containing liquid remains in the quadrivalent state. The selenite can be treated by any process which has been used in the prior art. Accordingly, the present invention can remove the selenium only by any existing wastewater treatment equipment without installation of any new facility for reducing the selenate. Therefore, the present invention provides a superior advantage that the cost required to remove the selenium can be drastically decreased.

BRIEF DESCRIPTION OF THE DRAWINGS

FIG. 1 shows graphs showing the results of Experimental Example 1.

FIG. 7 shows graphs showing the results of Example 1.

FIG. 8 shows a graph showing the results of Experimental Example 6.

FIG. 9 shows graphs showing the results of Example 2.

DESCRIPTION OF PREFERRED EMBODIMENTS

The present invention is directed to treat a selenium-containing liquid such as industrial wastewater or wastewater from the wet flue gas desulfurization unit in the coal fired power plant. The behavior of selenium in the absorbing solution (desulfurization slurry) of the wet flue gas desulfurization unit will be described by way of example. In the coal fired power plant, flue gas from a boiler is exhausted to the atmosphere through the NOx removal equipment, electrostatic precipitator and wet flue gas desulfurization unit. The flue gas from the boiler contains selenium which is introduced into the wet flue gas desulfurization unit through the NOx removal equipment and electrostatic precipitator. In the wet flue gas desulfurization unit, the selenium first exists as selenite. However, it has been believed that the selenite is gradually converted into selenate since the selenite is oxidized with oxidation agents which are produced in the oxidizing atmosphere within the desulfurization unit.

The oxidation agents include peroxodisulfuric acid, hypochlorous acid and hydrogen peroxide. However, the main oxidation agent which oxidizes the selenite in the selenium-containing liquid is peroxodisulfuric acid. To decrease this peroxodisulfuric acid, it is conceivable that the selenium-containing liquid is heated at a temperature equal to or higher than 65° C. at which the peroxodisulfuric acid is decomposed. However, this is impractical.

Therefore, the present invention inhibits the formation of selenate by adding at least one selected from a group consisting of Ti and Mn to the selenium-containing liquid to decrease the peroxodisulfuric acid. In such a manner, the selenium can be treated simply and inexpensively, in comparison with the method of the prior art in which the already produced selenate is reduced into the selenite.

Here, the addition of Ti will be described. It is preferred that Ti is adjusted and added in the form of an aqueous Ti solution which is prepared by dissolving a Ti compound (e.g., titanium dioxide, titanium sulfate, titanium chloride melt or the like) or metal Ti with an acid (e.g., sulfuric acid, nitric acid, hydrochloric acid or the like). If the addition of Ti is performed in such a manner, the oxidation agents can be decomposed to inhibit the formation of selenate even in an ambient temperature of 40-50° C. at which the oxidation of the selenium is easily promoted, that is, the atmosphere within the wet flue gas desulfurization unit. The more Ti is added, the more peroxodisulfuric acid is decomposed. However, it is preferable that the amount of Ti to be added is in the range of 10 mg/l to 50 mg/l, for example. This is because if the amount of Ti to be added is within this range, Ti may be added to the wastewater.

Next, the addition of Mn will be described. Since when Mn is added to the selenium-containing liquid in the form of a metal, the peroxodisulfuric acid preferentially reacts with Mn. Thus, the reaction of the peroxodisulfuric acid itself with the selenite can be inhibited, thereby suppressing the formation of selenate. Additionally, Mn in the selenium-containing liquid is oxidized with the peroxodisulfuric acid to produce manganese dioxide as sediment, this manganese dioxide serving to absorb and immobilize the selenite. Thus, the amount of the selenite itself can be reduced to inhibit the formation of selenate.

In such a case, if the concentration of Mn in the selenium-containing liquid is lower than 2 mg/l, Mn in the selenium-containing liquid will be gradually absorbed and consumed by the manganese dioxide, then reduced. As a result, the selenate may probably begin to be produced. On the other hand, if the concentration of Mn in the selenium-containing liquid is equal to or higher than 2 mg/l, the effect of Mn can be maintained to inhibit the formation of selenate even though Mn is oxidized with and gradually absorbed by the manganese dioxide.

The preferred concentration of Mn is in the range of 2 mg/l to 12 mg/l. If Mn is added with its concentration exceeding 12 mg/l, the selenate may be easily formed. The concentration of Mn is more preferably in the range of 5 mg/l to 9 mg/l to inhibit the formation of selenate more efficiently.

As described, Mn is oxidized with the peroxodisulfuric acid to produce the manganese dioxide. If no peroxodisulfuric acid exists in the selenium-containing liquid, therefore, the amount of Mn in the selenium-containing liquid will not be changed since Mn is not oxidized with the peroxodisulfuric acid. That is to say, Mn itself remains in the selenium-containing liquid without reacting if no peroxodisulfuric acid exists in the selenium-containing liquid although Mn has been added thereto. Accordingly, once Mn is added to the selenium-containing liquid, Mn itself remains in the selenium-containing liquid till the peroxodisulfuric acid is formed in the selenium-containing liquid. Thus, Mn will not be wastefully consumed.

Since this manganese dioxide is produced by oxidization of Mn with the peroxodisulfuric acid as described, the manganese dioxide will not be produced even if the selenium-containing liquid includes a substance other than the peroxodisulfuric acid (e. g., hypochlorous acid or oxygenated water) as an oxidation agent. Thus, the amount of Mn will not be decreased. Accordingly, the present invention can similarly provide an advantage in that Mn will not be wastefully consumed.

If the peroxodisulfuric acid continues to exist, Mn will be oxidized to lower its concentration in the selenium-containing liquid with elapse of time. If Mn is periodically added in the selenium-containing liquid to maintain the concentration of Mn equal to or higher than 2 mg/l, the oxidation of selenite, that is, the formation of selenate can be continuously inhibited. Accordingly, when the process of the present invention is applied to the selenium-containing liquid, only the concentration of Mn in the selenium-containing liquid may be monitored rather than monitoring the state of the selenium-containing liquid. Accordingly, the present invention can provide a process of treating a selenium-containing liquid which can be applied in a simple and easy manner.

It is preferred that Mn to be added in the selenium-containing liquid is zero-valent or bivalent. This is because if zero-valent or bivalent manganese is used, the oxidation of selenite to produce selenate can be inhibited efficiently. It is conceivable that the zero-valent or bivalent manganese serves as a reducer.

The zero-valent Mn means a solid-like metal Mn. The bivalent Mn means a solid-like bivalent Mn compound (e. g., MnO) and an aqueous Mn solution which is prepared to have bivalent ion ($Mn^{2+}$) by dissolving metal Mn or a bivalent Mn compound. Mn to be added to the selenium-containing liquid is preferably provided by adjusting an aqueous bivalent Mn solution which is prepared by using an acid (e.g., sulfuric acid, nitric acid, hydrochloric acid or the like) to dissolve metal Mn, a bivalent Mn compound (e.g., oxide, chloride, sulfide or sulfate) as well as metal Mn or a bivalent Mn compound. It is particularly preferred that Mn is added in the form of an aqueous Mn solution so that the handling and concentration control can be facilitated.

It is further preferred that Ti and Mn are added together into the selenium-containing liquid. Although the decomposition of peroxodisulfuric acid with Ti provides an advantage in that it is more effective than the reaction of Mn with the peroxodisulfuric acid, the speed of decomposition is slower. Therefore, the simultaneous addition of Ti and Mn can more effectively inhibit the formation of selenate.

The above process of treating a selenium-containing liquid is applied to selenium-containing wastewater such as industrial wastewater and desulfurization slurries in the wet flue gas desulfurization unit. If the present invention is applied to desulfurization slurries from the wet flue gas desulfurization unit, the formation of selenate can be simply and easily inhibited by locating means for adding an aqueous Ti or Mn solution at a location where the selenite exists to provide a possibility of advancing the oxidation of the selenium (e.g., the interior of a desulfurization tower or piping upstream of the site in which slurries from a circulating line or wastewaters from a desulfurization unit are introduced into a wastewater treatment equipment).

The present invention will now be described in detail with reference to examples and comparative examples based on experimental examples. In the drawings showing experimental examples, examples and comparative examples, the selenite is shown by $Se^{4+}$ while the selenate is shown by $Se^{6+}$.

EXPERIMENTAL EXAMPLE 1

This experimental example checked whether or not peroxodisulfuric acid was included in desulfurization slurries as an oxidation agent.

Three samples of desulfurization slurries were sampled from the wet flue gas desulfurization unit. These samples of desulfurization slurries were then filtered and each diluted to its volume 10 times larger than its original volume to provide samples (1)-(3). These samples of desulfurization slurries were analyzed through the ion chromatography together with comparative sample (4) (an aqueous peroxodisulfuric acid solution in which the concentration of the peroxodisulfuric acid was 10 mg/l). The ion chromatography performed the measurements in a non-suppressor manner by using a guard column (Shodex IC IA-G, Showa Denko) with a separation column (Shodex IC I-524a, Showa Denko). Eluant used was an aqueous solution consisting of phthalic acid and tris-aminomethane (which was also referred to as 2-amino-2-hydroxymethyl-1,3-propanediol). The results of analysis are shown in FIG. 1A.

Figure 1A:
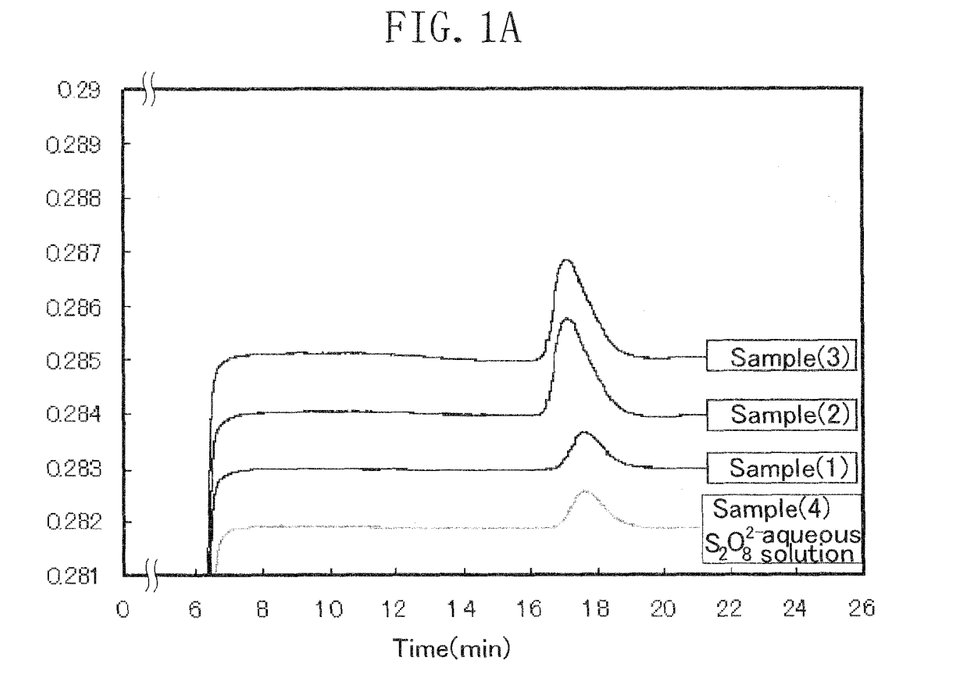
FIG. 1A showing measurements by the ion chromatography.

FIG. 1A is a graph showing measurements in the ion chromatography. It is found from this graph that the samples (1)-(3) contained the peroxodisulfuric acid as an oxidation agent in the desulfurization slurries since these samples had peaks of intensity within substantially the same time period (about 17 minutes) as in the comparative sample (4) which was an aqueous peroxodisulfuric acid solution.

Subsequently, it was checked whether or not the samples contain any other oxidation agent than the peroxodisulfuric acid. Desulfurization slurries sampled from the wet flue gas desulfurization unit were filtered and then each diluted to its volume 100 times larger than its original volume 100 to provide samples (5)-(17). The concentrations of oxidation agents in the samples (5)-(17) and samples prepared by further diluting the samples (1)-(3) each to its volume 10 times larger than its previous volume were measured using a residual chlorine analyzer (HI 95711 Type, HANNA instruments company) which utilized the DPD absorptiometry. For comparison, the sample (4) was divided into three samples (4-1), (4-2) and (4-3) of different concentrations. These samples (4-1), (4-2) and (4-3) were similarly measured. The resulting measurements were calibrated on the assumption that all the oxidation agents were peroxodisulfuric acid. The results of these measurements are shown in FIG. 1B.

Figure 1B:
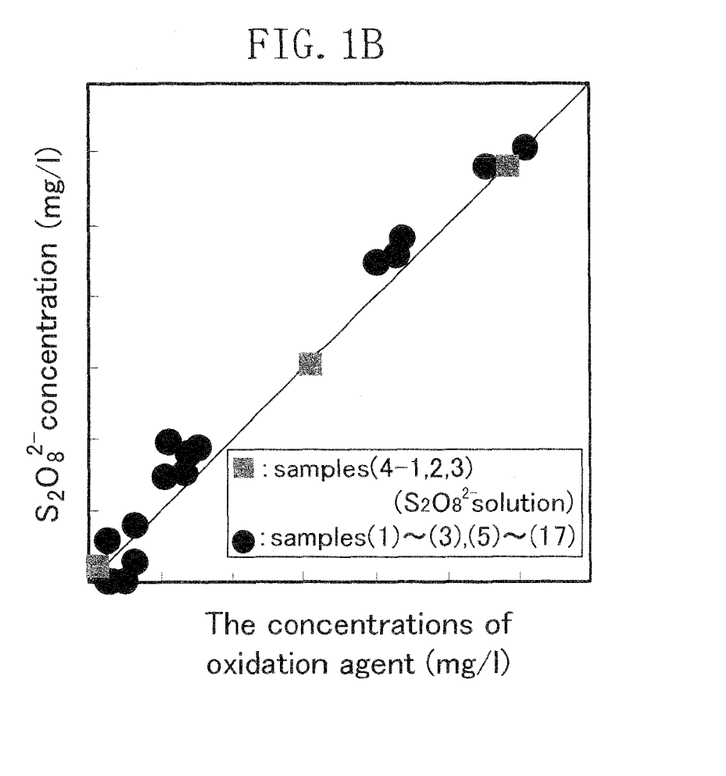
FIG. 1B showing measurements by the DPD method.

FIG. 1B is a graph having a vertical axis which shows the concentrations of peroxodisulfuric acid measured through the ion chromatography and a transverse axis which shows the compensated concentrations of the other oxidation agent measured by the residual chlorine analyzer. From these results, it is found that the main oxidation agent in the desulfurization slurries is peroxodisulfuric acid since the concentration of oxidation agent substantially corresponds to the concentration of peroxodisulfuric acid in all the samples.

Based on this experimental example, it was found that the oxidation agent in the desulfurization slurries was peroxodisulfuric acid.

EXPERIMENTAL EXAMPLE 2

In the experimental example 2, it was checked whether or not the selenium was oxidized with peroxodisulfuric acid to convert selenite into selenate.

Selenite was added to the following samples (18)-(20)

(18) Base: Ion-exchanged water
  Peroxodisulfuric acid: 0 mg/l
(19) Base: Aqueous peroxodisulfuric acid solution
  Peroxodisulfuric acid: 200 mg/l
(20) Base: Filtrate of the desulfurization slurry in the wet flue gas desulfurization unit
  Peroxodisulfuric acid: 274 mg/l Although the sample (20) uses the filtrate of the desulfurization slurry rather than the desulfurization slurry itself, this is because the selenium is prevented from being absorbed by any solid material (e. g., gypsum). The prepared samples were distributed into four glass absorption bottles, respectively, and maintained for 12 hours under the following conditions before changes in selenium concentration were checked:

(i) Temperature: Room temperature
  Atmosphere within the beaker: Sealed air atmosphere
(ii) Temperature: Room temperature
  Atmosphere within the glass absorption bottle: Air bubbling
(iii) Temperature: 50° C.
  Atmosphere in the glass absorption bottle: Sealed air atmosphere
(iv) Temperature: 50° C.
  Atmosphere within the glass absorption bottle: air bubbling The results are shown in FIGS. 2A-2C.

Figure 2A:
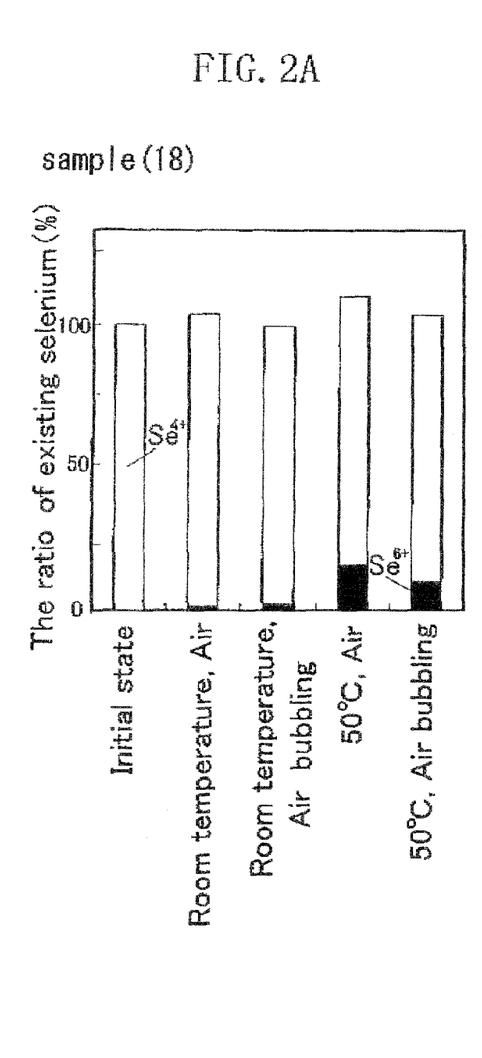
FIG. 2 shows graphs showing the results of Experimental Example 2 and showing the existing ratio of selenium when various conditions are changed.
Figure 2B:
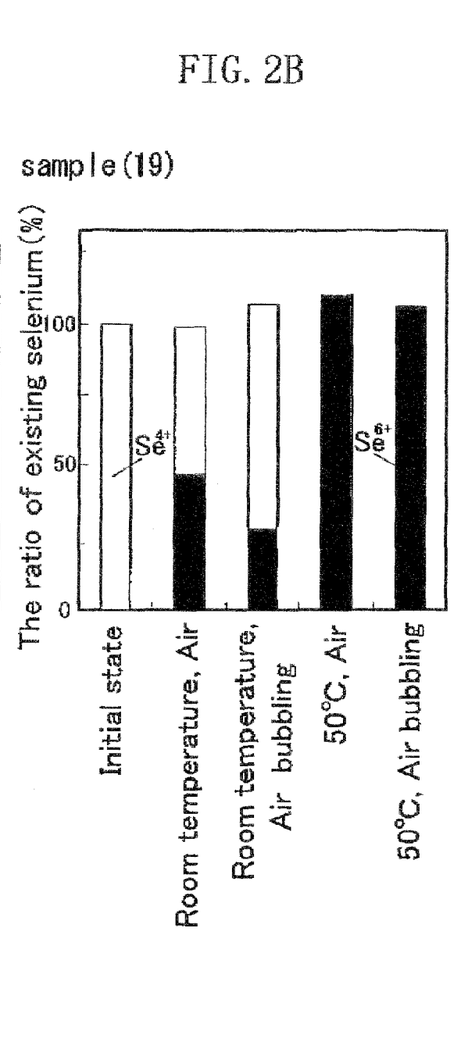
Figure 2C:
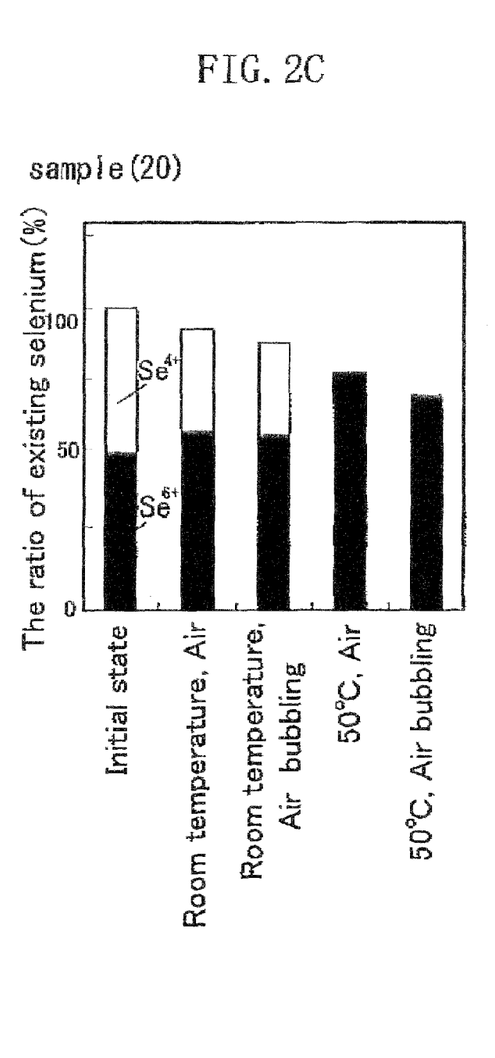

In FIG. 2, a vertical axis shows the ratio of existing selenium if it is assumed that 100% selenium exists in its initial state, wherein white-colored parts showing selenite while black-colored parts showing selenate. Although FIGS. 2A and 2B show that the samples (18) and (19) included only the selenite, FIG. 2C shows that the sample (20) comprising the filtrate initially included the selenate.

As can be seen in FIG. 2A, in the sample (18), the selenium remained quadrivalent at room temperature. The selenate of about 10% was produced only when the sample (18) was maintained at 50° C. Thus, it is found that even if the peroxodisulfuric acid is not included, the selenium is oxidized at a certain increased temperature. It is further found from FIG. 2B that in the sample (19) containing the peroxodisulfuric acid, the selenate is produced even at room temperature while the selenate entirely occupied at 50° C. This shows that the oxidation of selenium is promoted by the peroxodisulfuric acid. It is further found from FIG. 2C that not much the selenate was produced at room temperature, but all the selenium in the filtrate was converted into the selenate at 50° C. It is thus found that the peroxodisulfuric acid contributed to the oxidation of selenium even in the filtrates of the desulfurization slurries which contained various substances.

Based on the experimental example 2, it was decided that the peroxodisulfuric acid participates in the oxidation of selenium and that the oxidation of selenium is promoted at increased temperatures. It was also found that the peroxodisulfuric acid more contributes to the oxidation of selenite rather than introduction of oxygen by air bubbling.

EXPERIMENTAL EXAMPLE 3

In the experimental example 3, it was checked whether the oxidation of selenium could be inhibited by decomposing the peroxodisulfuric acid.

Selenite was added to the following sample (21):
(21) Base: Sample prepared by heating the sample (20) at 90° C. to decompose and remove the peroxodisulfuric acid
  Peroxodisulfuric acid: 0 mg/l Thereafter, the sample (21) was divided into four beakers which were maintained for 12 hours under the same conditions (i)-(iv) as in the experimental example 2. Changes of the selenium concentration were then checked. The results are shown in FIG. 3.

Figure 3:
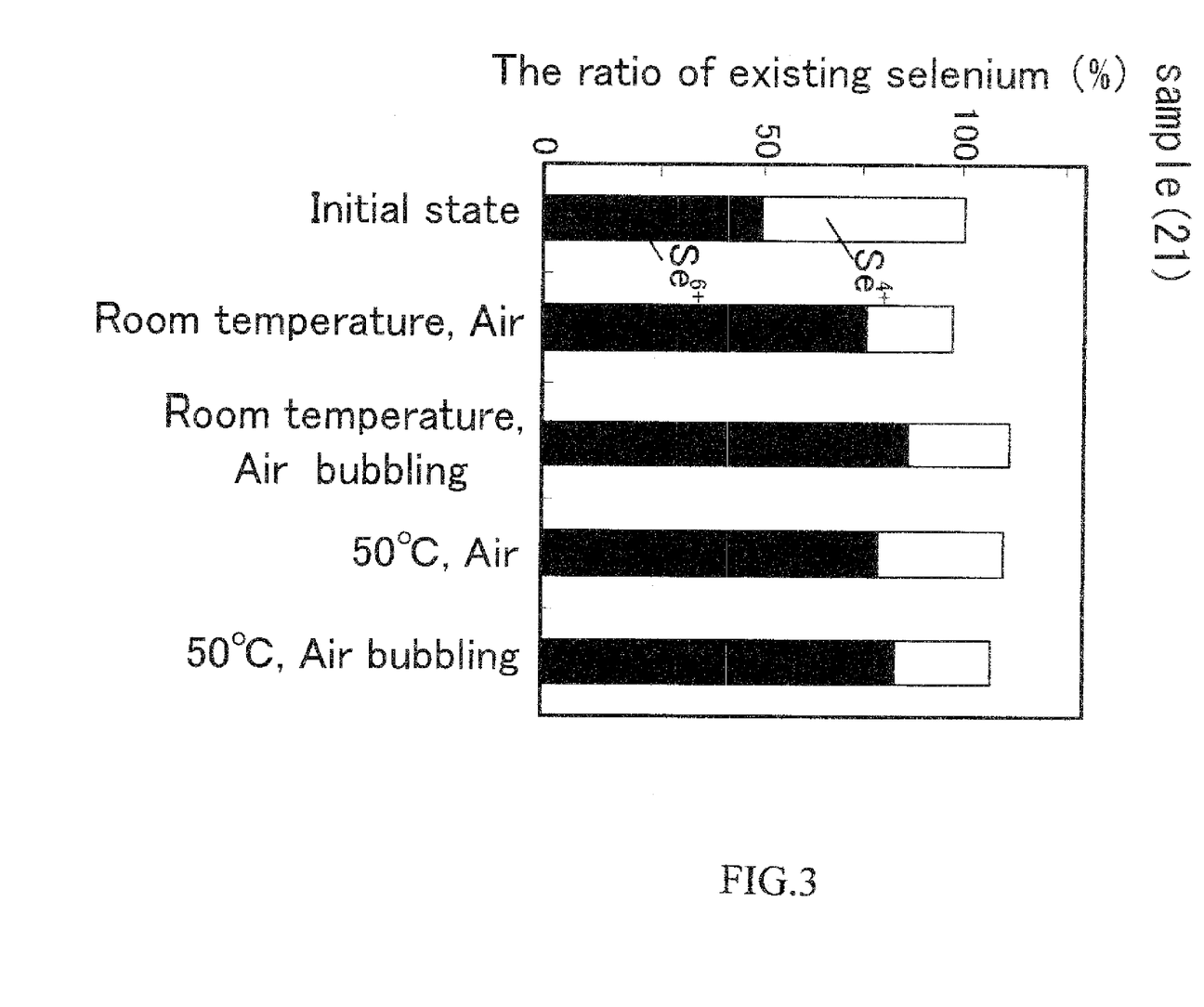
FIG. 3 shows a graph showing the results of Experimental Example 3 and showing the existing ratio of selenium when the peroxodisulfuric acid is decomposed.

It is found from FIG. 3 that in the sample (21) in which all the peroxodisulfuric acid was decomposed by heating, all the selenium in the filtrate was not oxidized into the selenate even at the temperature of 50° C. In respect to this regard, the sample (21) is largely different from the sample (20) since the selenium in the sample (20) in which the peroxodisulfuric acid was not decomposed by heating (see the experimental example 2) was all converted into the selenate at 50° C.

It is thus found from this result that the formation of selenate can be inhibited by decomposing the peroxodisulfuric acid.

EXPERIMENTAL EXAMPLE 4

In the experimental example 4, changes in the concentration of peroxodisulfuric acid were checked by adding a Ti containing liquid into the following samples (22) and (23) which were in turn maintained at 50° C. for 20 hours and 48 hours, respectively. The Ti containing liquid was an aqueous Ti solution (Trade Name: Titanium Standard Solution, Product Number 40882-1B, Kanto Chemical Industry Company). On addition, the concentration of Ti was 50 mg/l.

(22) Base: Aqueous peroxodisulfuric acid solution
  Peroxodisulfuric acid: 300 mg/l
(23) Base: Sample prepared by adding the peroxodisulfuric acid into the filtrate of desulfurization slurry in the wet flue gas desulfurization unit
  Peroxodisulfuric acid: 300 mg/l The results are shown in FIG. 4.

Figure 4A:
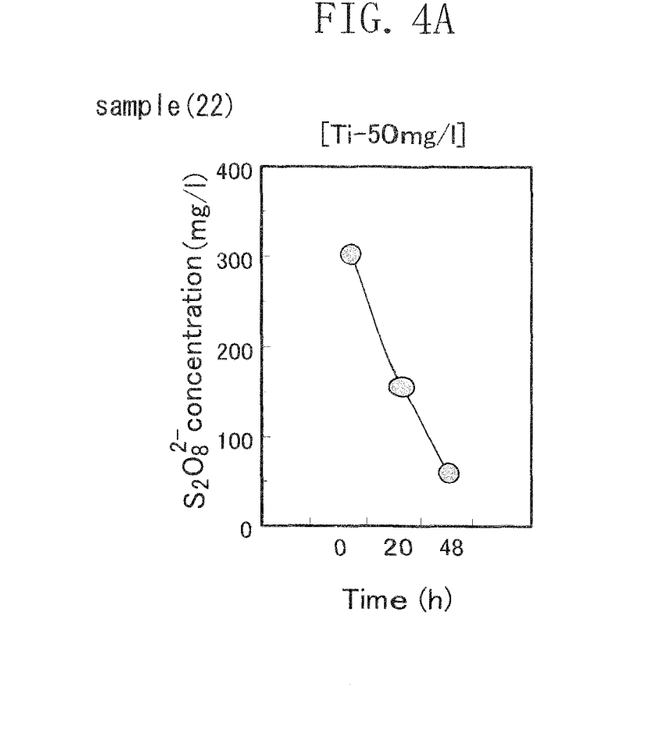
FIG. 4 shows graphs showing the results of Experimental Example 1 and showing changes in the concentration of peroxodisulfuric acid.
Figure 4B:
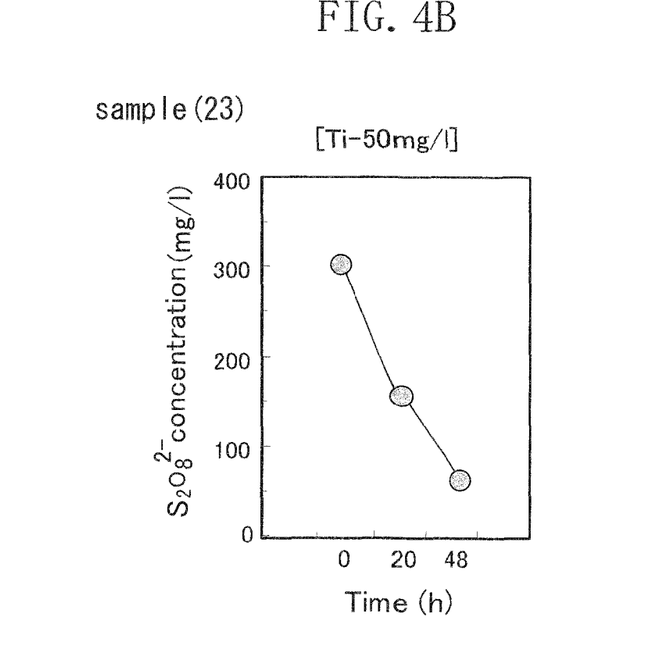

It is found from FIG. 4A that when the aqueous Ti solution was added to the sample (22), the concentration of the peroxodisulfuric acid was largely decreased from 300 mg/l to 50 mg/l within 48 hours. It is also found from FIG. 4B that even when the aqueous Ti solution was added to the sample (23), the concentration of peroxodisulfuric acid was largely decreased from 300 mg/l to 50 mg/l within 48 hours.

It is thus found that the concentration of peroxodisulfuric acid can be decreased by adding Ti to the selenium-containing liquid. Accordingly, it is found from the experimental examples 3 and 4 that the formation of selenate can be inhibited by adding Ti to the selenium-containing liquid to decrease the concentration of peroxodisulfuric acid.

EXPERIMENTAL EXAMPLE 5

Figure 5:
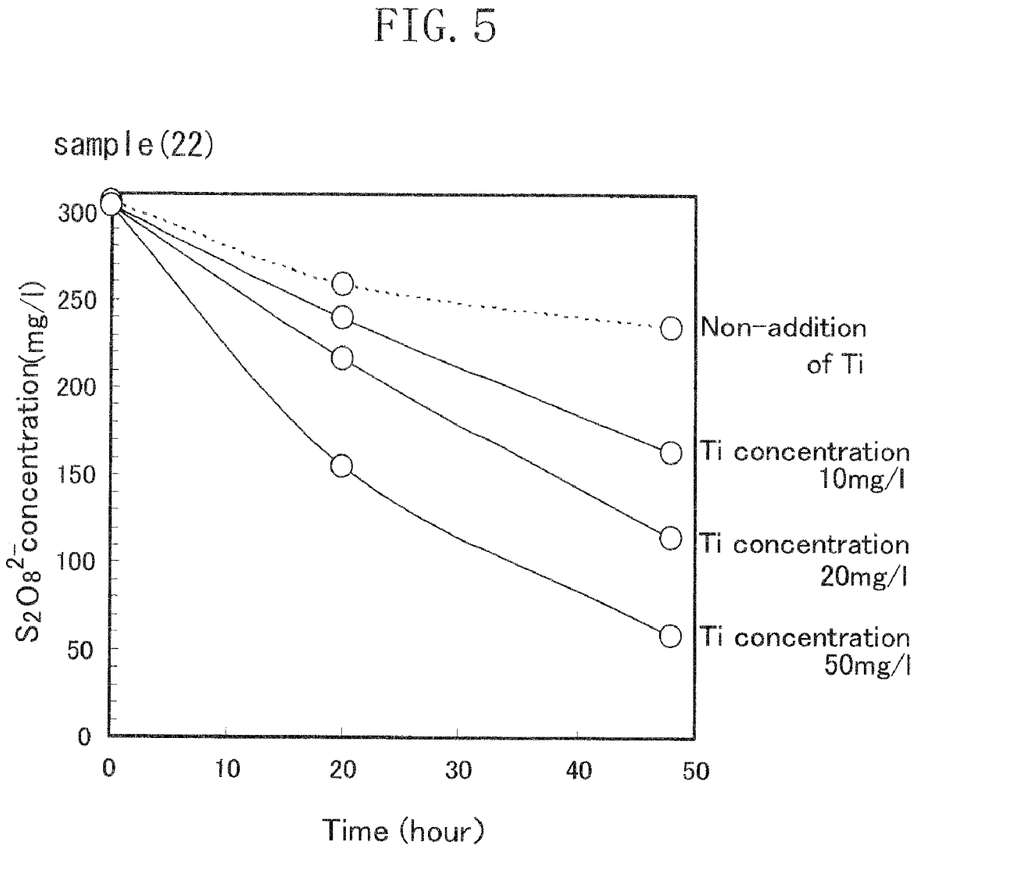
FIG. 5 shows a graph showing the results of Experimental Example 1 and showing changes in the concentration of peroxodisulfuric acid.

In the experimental example 5, the sample (22) was checked in respect to the concentration of peroxodisulfuric acid under the same conditions as in the experimental example 4 except that the aqueous Ti solution was added to the sample (22) with different concentrations of 10 mg/l and 20 mg/l, respectively. The results are shown in FIG. 5. Meanwhile, for comparison, FIG. 5 also shows the results of the experimental example 4 and changes with time in the concentration of peroxodisulfuric acid of the sample (22) when the aqueous Ti solution was not added thereto.

As can be seen from FIG. 5, the concentration of peroxodisulfuric acid slowly decreases with time even when Ti is not added to the sample (22). On the contrary, if Ti was added to the sample (22) with a concentration of 10 mg/l, the concentration of the peroxodisulfuric acid reached about 160 mg/l after 48 hours. If Ti was added to the sample (22) with a concentration of 20 mg/l, the concentration of the peroxodisulfuric acid reached about 120 mg/l after 48 hours. Further, if Ti was added to the sample (22) with a concentration of 50 mg/l, the concentration of the peroxodisulfuric acid decreased the most to about 50 mg/l after 48 hours. It is thus found that the addition of Ti can provide more advantage than that of the sample (22) when the aqueous Ti solution was not added thereto, in that the concentration of peroxodisulfuric acid can be decreased that is, the more Ti concentration being added, the more advantage being provided.

It is found from the foregoing that if more Ti is added to the selenium-containing liquid, the formation of selenate can be more advantageously inhibited.

COMPARATIVE EXAMPLE 1

In the comparative example 1, the concentration of peroxodisulfuric acid was checked in the sample (22) under the same condition as in the experimental example 4 except in that an aqueous Fe solution (Trade Name: Iron Standard Solution, Product Number 20247-1B, Kanto Chemical Industry Company) and an aqueous Ni solution (Trade Name: Nickel Standard Solution, Product Number 28577-1B, Kanto Chemical Industry Company) were added to the sample (22), respectively, in place of the aqueous Ti solution. For comparison, the samples (22) and (23) were checked in respect to changes in the concentration of peroxodisulfuric acid after these samples had been left for 48 hours. The results are shown in FIG. 6.

Figure 6A:
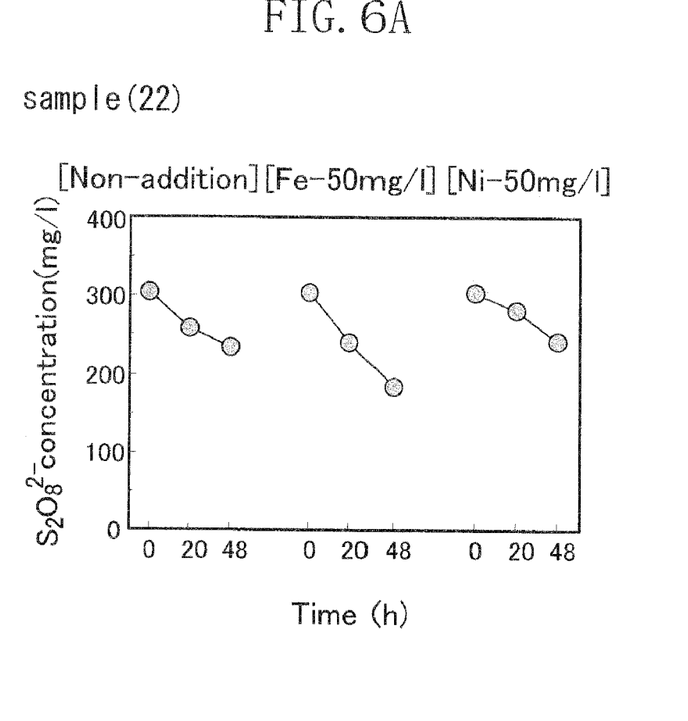
FIG. 6 shows graphs showing the results of Comparative Example 1 and showing changes in the concentration of peroxodisulfuric acid.
Figure 6B:
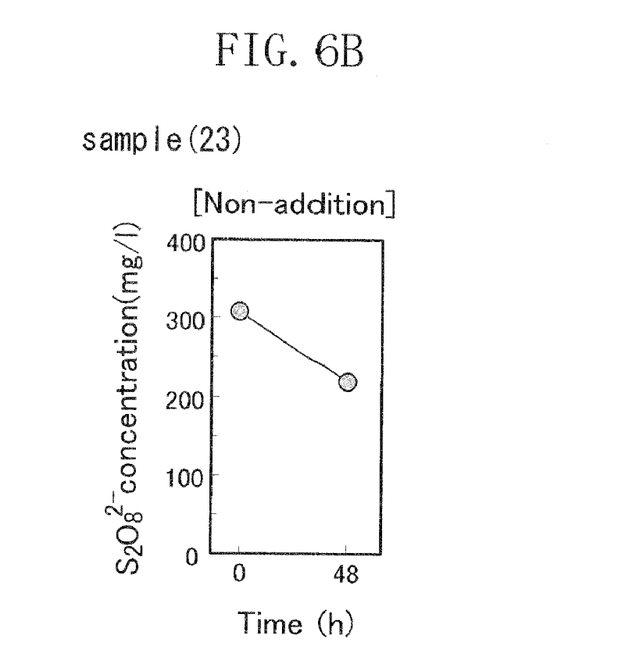

In the sample (22) shown in FIG. 6A, it could not be found that even when any other aqueous metal solution was added thereto, the concentration of peroxodisulfuric acid was largely varied in comparison with the case when no aqueous metal solution was added to the sample (22).

EXAMPLE 1

In the example 1, the concentration of Mn and the change of the selenium concentration with time were checked.

180 µg/l of selenite was added to an aqueous peroxodisulfuric acid solution (peroxodisulfuric acid: 300 mg/l) Subsequently, an aqueous Mn solution (Trade Name: Manganese Standard Solution, Product Number 25824-1B, Kanto Chemical Industry Company) was added to the same aqueous peroxodisulfuric acid solution so that the concentration of Mn became equal to 2 mg/l, 5 mg/l and 10 mg/l, respectively. In such a manner, samples (24)-(26) were provided. These samples were maintained at 50° C. which was the actual temperature of desulfurization slurries in the wet flue gas desulfurization unit. Thereafter, the Mn concentration and changes thereof were checked. The results are shown in FIGS. 7A-7C.

Figure 7A:
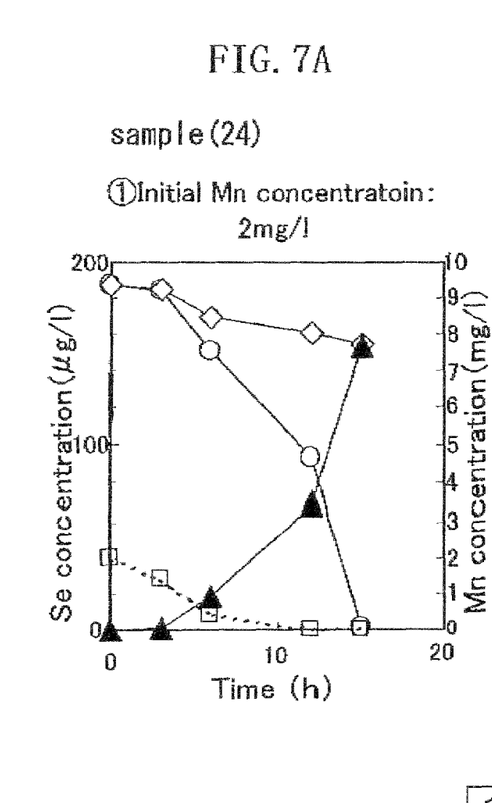
FIGS. 7A-7C showing the concentrations of selenium and Mn which are variable with time.
Figure 7B:
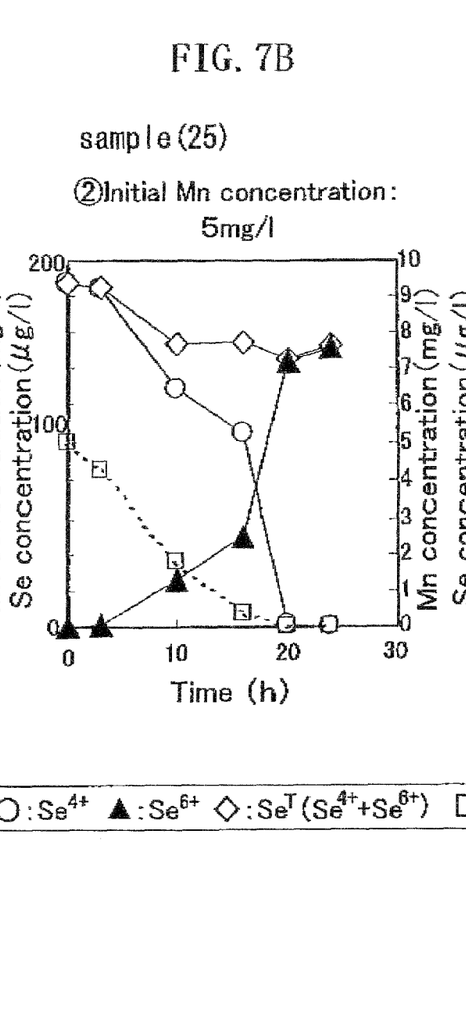
Figure 7C:
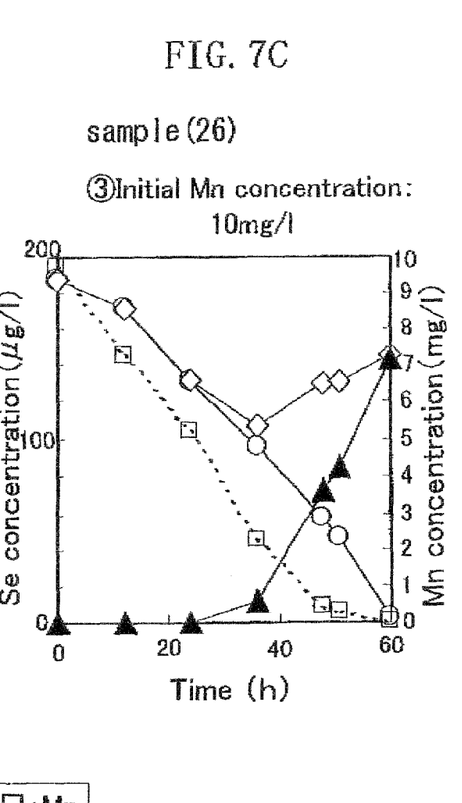

FIGS. 7A-7C show graphs in initial Mn concentrations: FIG. 7A 2 mg/l; FIG. 7B 5 mg/l; and FIG. 7C 10 mg/l, respectively. It is found from FIGS. 7A-7C that the concentration of Mn was gradually decreased with time. At this time, sediment was gradually produced in the sample. It was found through analysis that this sediment was manganese dioxide. The manganese dioxide was produced by oxidizing Mn with the peroxodisulfuric acid which was an oxidation agent. It is found from FIGS. 7A-7C that the concentration of selenate began to increase when the concentration of Mn became less than 2 mg/l, the concentration of selenate suddenly increasing as the concentration of Mn decreases close to 0 mg/l, and all the selenite being finally oxidized and converted into the selenate. For example, in FIG. 7C, the formation of selenate could not be found even after about 22 hours. However, the concentration of selenate began to increase substantially after about 37 hours when the concentration of Mn became less than about 2 mg/l. It is apparent from this fact that the formation of selenate can be efficiently inhibited if the concentration of Mn is equal to or higher than 2 mg/l in the selenium-containing liquid.

EXPERIMENTAL EXAMPLE 6

In the experimental example 6, change with time in the concentration of selenium was checked in the selenium aqueous solution that no peroxodisulfuric acid was added.

An aqueous Mn solution (Trade Name: manganese standard solution, Product Number 25824-1B, Kanto Chemical Industry Company) was added to an aqueous selenium solution prepared so that the concentration of selenite became equal to 180 µg/l to provide samples (27)-(29) having their concentrations of Mn equal to 5 mg/l, 10 mg/l and 30 mg/l, respectively. These samples were maintained at 50° C. that was the actual temperature of the desulfurization slurries in the wet flue gas desulfurization unit and thereafter checked in respect to change with time in the concentration of selenium. Change with time in the concentration of selenium was also checked for a comparative sample which did not contain Mn and which was maintained at 50° C. The results are shown in FIG. 8.

Figure 8:
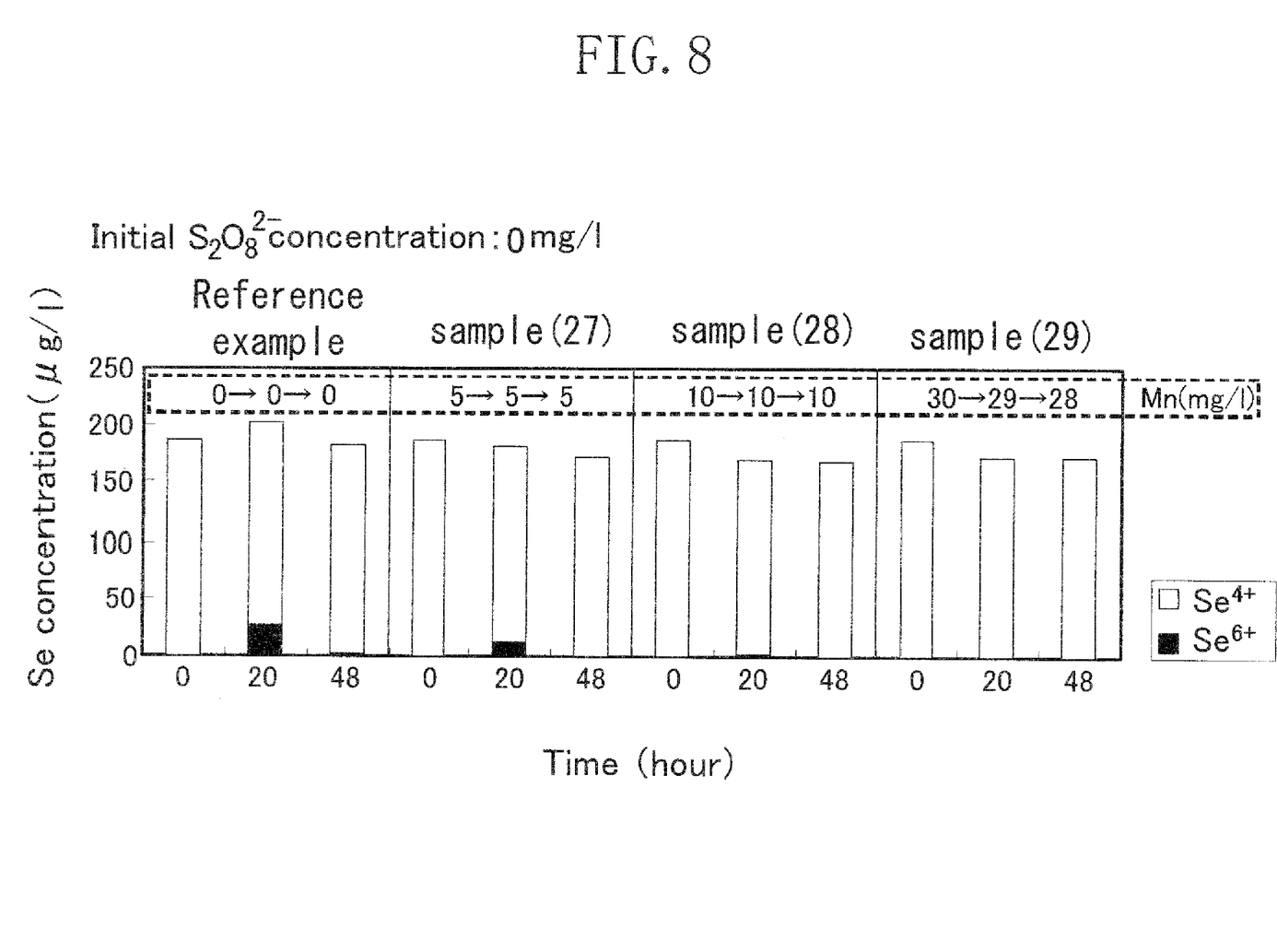
FIG. 8 showing the existing ratios of selenium when various conditions are changed.
Figure 9A:
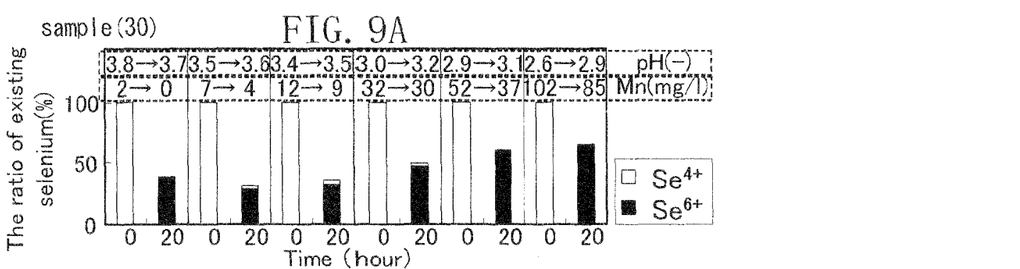
FIGS. 9A-9E showing the existing ratios of selenium when the concentration of Mn is changed in various desulfurization slurries.
Figure 9B:
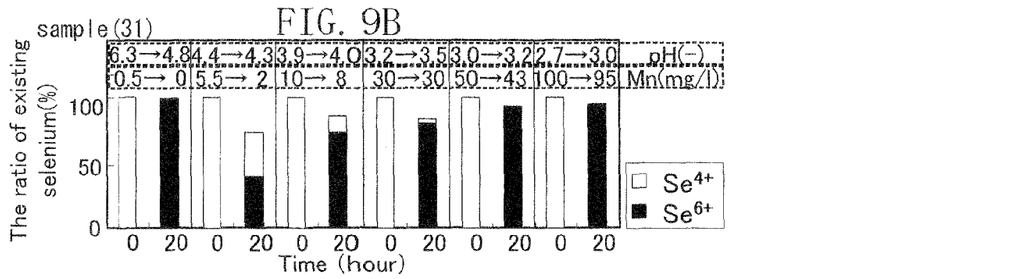
Figure 9C:
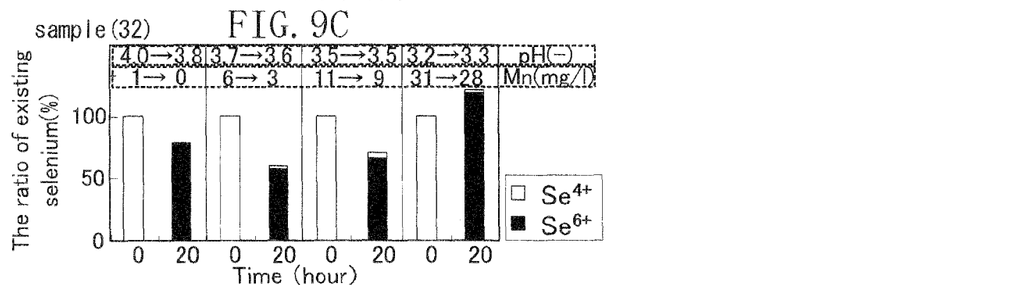
Figure 9D:
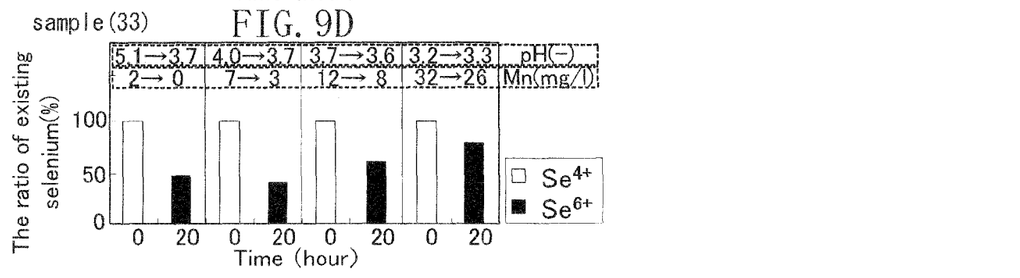
Figure 9E:
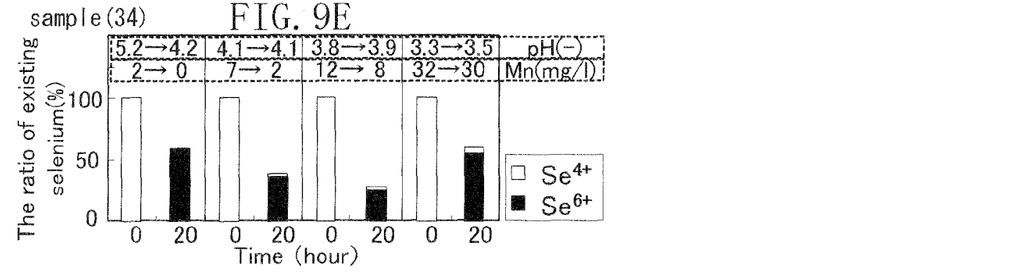

FIG. 8 is a graph illustrating changes with time in the concentration of selenium when the concentration of Mn was equal to 0 mg/l, 5 mg/l, 10 mg/l and 30 mg/l, respectively. It is found from FIG. 8 that in any case, the selenate was not produced or even if was produced, it was a very small amount. No formation of sediment was found in any aqueous selenium solution and almost no change in the concentration of Mn was found. It is found from this fact that the oxidation creating selenate almost did not occur if the peroxodisulfuric acid as an oxidation agent did not exist in the selenium-containing liquid and that even if Mn is in the selenium-containing liquid, Mn would not be oxidized to produce manganese dioxide without existence of oxidation agent, thereby Mn remaining in the selenium-containing liquid without being consumed.

It is thus found that if no peroxodisulfuric acid exists in the selenium-containing liquid, that is, if the selenium-containing liquid contains no oxidation agent, the oxidation converting the selenium from quadrivalent into hexavalent almost does not occur and at the same time the oxidation converting Mn into manganese dioxide does not occur. As a result, Mn will not be wastefully used.

EMBODIMENT 2

In the embodiment 2, Mn was added to desulfurization slurries to check changes in the concentration of selenium.

Selenite was added to samples of desulfurization slurry (30)-(34) adjusted so that the concentration of peroxodisulfuric acid is equal to 300 mg/l, respectively. At the same time, an aqueous Mn solution (Trade Name: manganese standard solution, Product Number 25824-1B, Kanto Chemical Industry Company) was added to the samples of desulfurization slurry (30)-(34) while varying the concentration thereof. Thereafter, the desulfurization slurry samples (30)-(34) were maintained at 50° C. before the concentration of Mn and the existence of selenium were checked. The results are shown in FIG. 9.

FIGS. 9A-9E are graphs each showing the relationship between a different Mn concentration and a change with time in the selenium in each of the desulfurization slurry samples (30)-(34), the Mn concentration and Ph value at the respective time being shown in the top of the graph. As can be seen from FIG. 9, every sample (30)-(34) includes only selenate after 20 hours if the initial concentration of Mn (which is initially measured in the desulfurization slurry mass without addition of Mn itself) is less than 2 mg/l. On the contrary, if the initial concentration of Mn was higher than 2 mg/l by adding Mn thereto, the existence ratio of selenate included in the samples after 20 hours was decreased with some selenite existing therein. On the other hand, the existence ratio of selenate increased if the initial concentration of Mn was excessively high. In other words, if the initial concentration of Mn excessively increased, the selenate was more formed. Particularly, if the initial concentration of Mn exceeded 30 mg/l, the selenate was more formed in the samples (30)-(34), resulting in substantially the same measurements as in the case of non-addition of Mn. It is thus found that it is preferable to maintain the concentration of Mn higher than 2 mg/l. It is also found that if the initial concentration of Mn was too high, the formation of selenate may not be effectively inhibited. The reason why the ratio of selenium decreases after 20 hours rather than the initial state (0 hours) is that the selenite is immobilized by the sediment of manganese dioxide.

Figure 10:
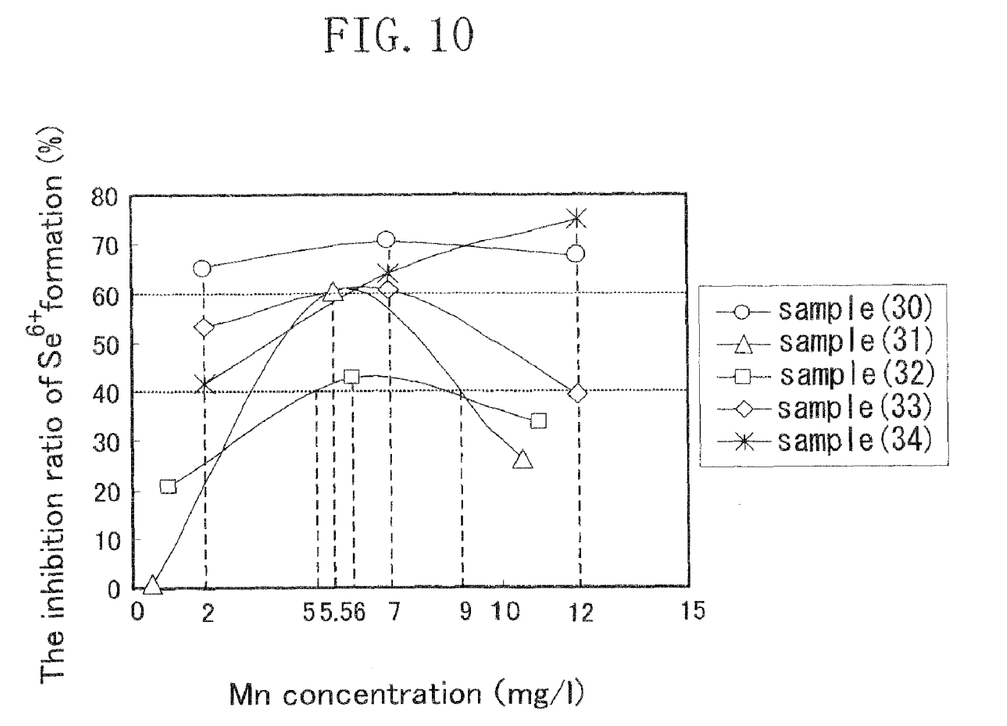
FIG. 10 shows a graph showing the results of Example 2 and showing the efficiency of inhibition for the formation of selenate.

To know the optimum concentration of Mn which can efficiently inhibit the formation of selenate, the inhibition ratio of selenate formation was checked. FIG. 10 is a graph showing the relationship between the concentration of Mn and the inhibition ratio of selenate formation. The inhibition ratio of selenate formation is ((an initial amount of selenite—an amount of selenate after 20 hours)/an initial amount of selenite) which represents how much selenite was inhibited to be converted into selenate.

It is found from FIG. 10 that peak inhibition ratios of selenate formation in the samples (30)-(34) are between 2 mg/l and 12 mg/l in the initial Mn concentration. It is also found that, if the initial concentration of Mn is between about 5 mg/l and about 9 mg/l, the inhibition ratio of selenate formation can be equal to or higher than 40%. It is further found that, if the initial concentration of Mn is in the range of about 5.5 mg/l to about 7 mg/l, the optimum advantage can be obtained. In particular, the inhibition ratio of selenate formation is equal to or higher than 60% in the samples (30), (31), (33) and (34).

It is found from these embodiments and experimental examples that if the concentration of Mn to be added is preferably in the range of 2-12 mg/l, more preferably 5-9 mg/l and most preferably 5.5-7 mg/l and when the concentration of Mn which decreased by the formation of sediment is thereafter maintained equal to or higher than 2 mg/l while inhibiting the formation of sediment, the formation of selenate can be inhibited by Mn which exists in the desulfurization slurries to initiate the oxidation creating selenate.

EXAMPLE 3

In the example 3, Ti and Mn were added to the selenium-containing liquid to check the inhibition effect of selenate formation and changes in the concentration of peroxodisulfuric acid.

180 µg/l of selenite was added to an aqueous peroxodisulfuric acid solution (peroxodisulfuric acid: 300 mg/l). An aqueous Mn solution (Trade Name: Manganese Standard Solution, Product Number 25824-1B, Kanto Chemical Industry Company) and an aqueous Ti solution (Trade Name: Titanium Standard Solution, Product Number 40882-1B, Kanto Chemical Industry Company) were then added to the aqueous peroxodisulfuric acid solution so that the concentrations of Ti and Mn were equal to 10 mg/l. Such a mixture was used as a sample (35). The sample (35) was maintained at 50° C. to check the concentration of peroxodisulfuric acid and the ratio of selenium existing therein. The results are shown in FIG. 11.

Figure 11:
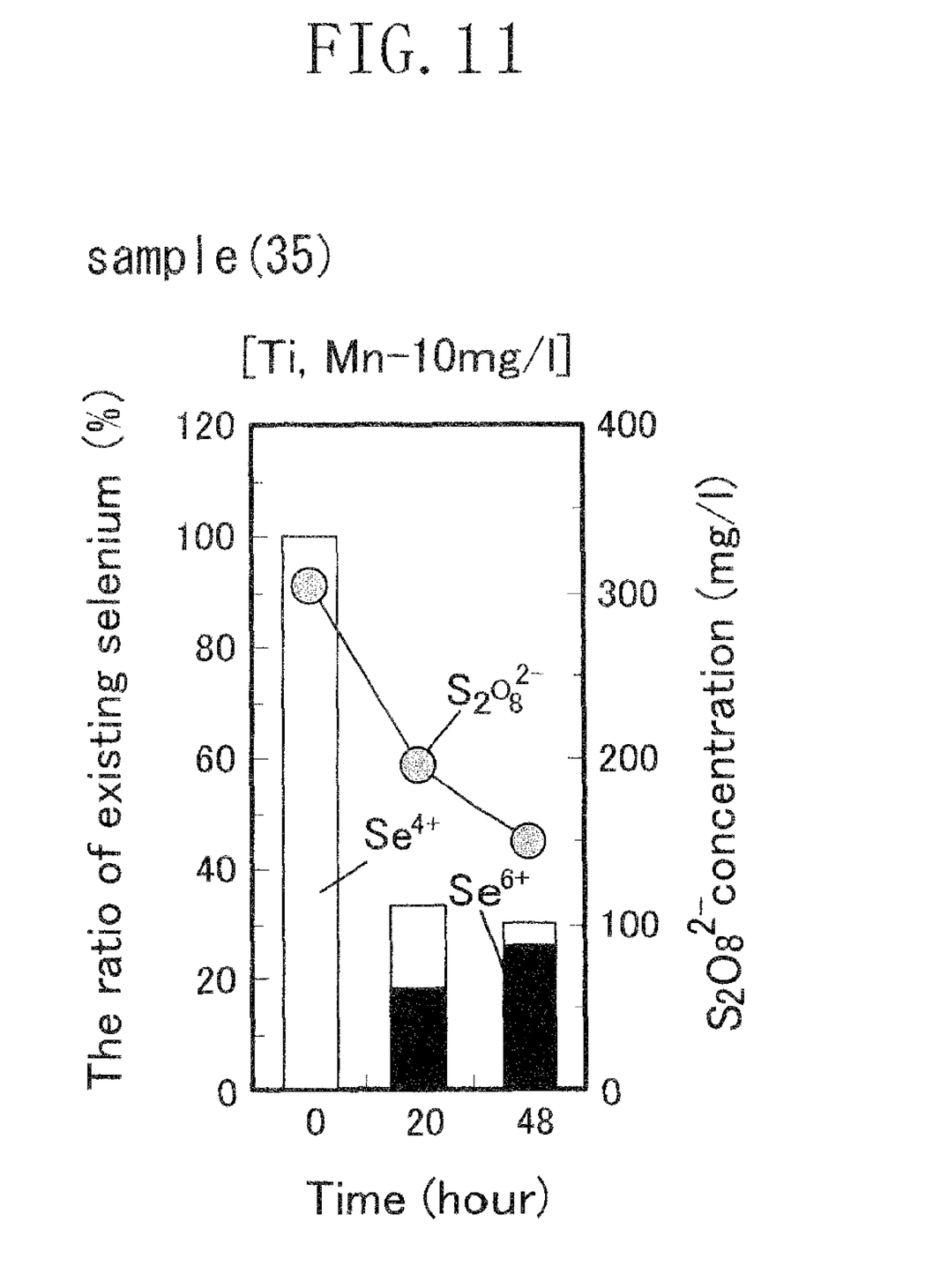
FIG. 11 shows a graph showing the results of Example 3 and showing the concentrations of selenium and peroxodisulfuric acid.

It is found from FIG. 11 that, when Ti and Mn are added, the concentration of peroxodisulfuric acid decreases from 300 mg/l to 200 mg/l and further to 150 mg/l with time. In addition, the ratio of selenium decreases from 100% to about 30% and finally to about 25%. This means that the selenate was inhibited from being formed. It is conceivable that this is because the peroxodisulfuric acid is decomposed by the added Ti and at the same time Mn oxidized with the peroxodisulfuric acid in place of selenium to form the sediment of manganese dioxide to which the selenite is immobilized.

It is thus found that if Ti and Mn are added, both the advantages of Ti and Mn can be provided. Namely, the decomposition of the peroxodisulfuric acid by the addition of Ti and at the same time the inhibition of oxidation creating the selenate and the immobilization to the settled manganese dioxide by the addition of Mn can be realized.

The aforementioned process of treating a selenium-containing liquid can be applied to the absorbing solution (desulfurization slurry) in the wet flue gas desulfurization unit, desulfurizing wastewater and various other industrial wastewaters containing selenium. For example, if this process is to be applied to the desulfurization slurries including selenium from the wet flue gas desulfurization unit, means for adding at least one selected from a group consisting of Ti and Mn may be provided at a location where the selenite and an oxidation agent such as peroxodisulfuric acid may exist to promote the oxidizing reaction of the selenium. Thus, the formation of selenate can be inhibited in a simple and easy manner. In this case, the process of the present invention may be simply and easily applied to any kind of desulfurization slurries, although the types and concentrations of components included in the desulfurization slurries from the coal fired power plant are variable depending on the types of coals spent by the boiler thereof. If the selenite exists without being oxidized to produce selenate, it is not required to install anew facility for reducing the selenium. Thus, any existing wastewater treatment equipment can be used to clear the effluent standard for selenium.

The process of treating a selenium-containing liquid according to the present invention can be used to treat the desulfurization slurries from the wet flue gas desulfurization unit. Accordingly, the present invention is available in the field of effluent treatment.

What is claimed is:

1. A process of treating a selenium-containing liquid wherein the formation of selenate is inhibited, and the selenium-containing liquid is an absorbed liquid from a wet flue gas desulfurization unit, by adding Mn which is zero-valent or bivalent to the selenium containing liquid which contains selenite and peroxodisulfuric acid, and reacting the peroxodisulfuric acid with the Mn to produce manganese dioxide, thereby inhibiting oxidation of the selenite with the peroxodisulfuric acid.

2. The process of treating a selenium-containing liquid as defined in claim 1, wherein the formation of selenate is inhibited by adding Mn to the selenium-containing liquid so that the concentration of Mn is equal to or higher than 2 mg/l in the selenium-containing liquid.

3. The process of treating a selenium-containing liquid as defined in claim 2, wherein the formation of selenate is inhibited by adding Mn to the selenium-containing liquid so that the concentration of Mn is in the range of 2 mg/l to 12 mg/l in the selenium-containing liquid.

4. The process of treating a selenium-containing liquid as defined in claim 3, wherein the formation of selenate is inhibited by adding Mn to the selenium-containing liquid so that the concentration of Mn is in the range of 5 mg/l to 9 mg/l in the selenium-containing liquid.

5. The process of treating a selenium-containing liquid as defined in claim 1, wherein the concentration of Mn in the selenium-containing liquid to which Mn is added is maintained equal to or higher than 2 mg/l.

6. The process of treating a selenium-containing liquid as defined in claim 1, wherein Mn is added to the selenium-containing liquid in the form of an aqueous Mn solution.

* * * * *